United States Patent
Xie et al.

(10) Patent No.: US 11,388,336 B2
(45) Date of Patent: Jul. 12, 2022

(54) HORIZONTAL CALIBRATION METHOD AND SYSTEM FOR PANORAMIC IMAGE OR VIDEO, AND PORTABLE TERMINAL

(71) Applicant: ARASHI VISION INC., Shenzhen (CN)

(72) Inventors: Yuming Xie, Shenzhen (CN); Wenxue Peng, Shenzhen (CN)

(73) Assignee: ARASHI VISION INC., Shenzhen (CN)

( * ) Notice: Subject to any disclaimer, the term of this patent is extended or adjusted under 35 U.S.C. 154(b) by 334 days.

(21) Appl. No.: 16/490,594

(22) PCT Filed: Mar. 2, 2017

(86) PCT No.: PCT/CN2017/075446
§ 371 (c)(1),
(2) Date: Sep. 2, 2019

(87) PCT Pub. No.: WO2018/157350
PCT Pub. Date: Sep. 7, 2018

(65) Prior Publication Data
US 2020/0007761 A1 Jan. 2, 2020

(51) Int. Cl.
*G06K 9/00* (2022.01)
*H04N 5/232* (2006.01)
(Continued)

(52) U.S. Cl.
CPC ......... *H04N 5/23238* (2013.01); *G02B 13/06* (2013.01); *G06F 17/16* (2013.01);
(Continued)

(58) Field of Classification Search
CPC .... H04N 5/23238; G02B 13/06; G06F 17/16; G06K 9/6205; G06T 5/50; G06T 15/04;
(Continued)

(56) References Cited

U.S. PATENT DOCUMENTS 9,503,638 B1* 11/2016 Nguyen ................. H04N 5/247
2003/0063089 A1* 4/2003 Chen ..................... G06T 3/4038
345/473
(Continued)

FOREIGN PATENT DOCUMENTS

CN 101221658 A 7/2008
CN 101923709 A 12/2010
(Continued)

OTHER PUBLICATIONS

Ivan, S. Kholopov, and V. Pavlov Oleg. "Spherical video panorama stitching from multiple cameras with intersecting fields of view and inertial measurement unit." 2016 International Siberian Conference on Control and Communications (Sibcon). IEEE, 2016. (Year: 2016).*
(Continued)

*Primary Examiner* — Avinash Yentrapati
(74) *Attorney, Agent, or Firm* — Cheng-Ju Chiang

(57) ABSTRACT

The present invention provides a horizontal calibration method and system for a panoramic image or video, and a portable terminal. The method comprises: receiving images or video frames of two circles after being imaged by two cameras having opposite photographing directions; obtaining a horizontal calibration matrix during photographing; and pasting, according to the horizontal calibration matrix, the images or video frames of the two circles to a left hemispherical curved surface and a right hemispherical curved surface of a spherical panoramic mathematical model in a UV mapping manner, respectively so that the panoramic images or video frames pasted in the spherical panoramic mathematical model are horizontal. According to the present invention, when an image or a video frame photographed by a panoramic camera is not horizontal, the panoramic image
(Continued)

or the video frame pasted in a spherical panoramic mathematical model is still horizontal.

12 Claims, 1 Drawing Sheet

(51) Int. Cl.
    *G02B 13/06*     (2006.01)
    *G06F 17/16*     (2006.01)
    *G06T 5/50*     (2006.01)
    *G06T 15/04*     (2011.01)
    *G06V 10/75*     (2022.01)

(52) U.S. Cl.
    CPC ............... *G06T 5/50* (2013.01); *G06T 15/04* (2013.01); *G06V 10/753* (2022.01); *G06T 2207/10004* (2013.01); *G06T 2207/20068* (2013.01); *G06T 2207/30244* (2013.01)

(58) Field of Classification Search
    CPC . G06T 2207/10004; G06T 2207/20068; G06T 2207/30244
    See application file for complete search history.

(56) References Cited

U.S. PATENT DOCUMENTS

| | | | |
|---|---|---|---|
| 2003/0063816 A1* | 4/2003 | Chen | G06T 3/0018 382/284 |
| 2004/0032407 A1 | 2/2004 | Ejiri et al. | |
| 2017/0134713 A1* | 5/2017 | Lin | H04N 13/246 |
| 2017/0195560 A1* | 7/2017 | Veldandi | H04N 5/23238 |
| 2017/0322400 A1* | 11/2017 | Englert | G02B 17/0808 |
| 2017/0363949 A1* | 12/2017 | Valente | G02B 27/0172 |
| 2020/0106960 A1* | 4/2020 | Aguilar | G06T 3/40 |
| 2021/0072518 A1* | 3/2021 | Giordano | G02B 13/06 |

FOREIGN PATENT DOCUMENTS

| | | | |
|---|---|---|---|
| CN | 103617606 A | | 3/2014 |
| CN | 104835117 A | | 8/2015 |
| CN | 105957048 A | | 9/2016 |
| CN | 106357966 A | * 1/2017 | ............ G02B 13/06 |
| CN | 106357966 A | | 1/2017 |

OTHER PUBLICATIONS

Vandeportaele, Bertrand, et al. "ORIENT-CAM, A camera that knows its orientation and some applications." Iberoamerican Congress on Pattern Recognition. Springer, Berlin, Heidelberg, 2006. (Year: 2006).*

* cited by examiner

HORIZONTAL CALIBRATION METHOD AND SYSTEM FOR PANORAMIC IMAGE OR VIDEO, AND PORTABLE TERMINAL

FIELD OF THE INVENTION

The present invention relates to a field of image processing, more specifically, to a horizontal calibration method and system for a panoramic image or video, and a portable terminal.

BACKGROUND OF THE INVENTION

The existing panoramic camera uses a dual fisheye and wide-angle camera to photograph images or videos, and get the images or video frames of two circles. Using a spherical panoramic mathematical model and UV mapping, mapping the images of the two circles respectively to the left hemispheric surface and the right hemispheric surface of the spherical panoramic mathematical model using UV mapping, when the panoramic camera is shooting vertically, the rendered image can become horizontal using UV mapping. UV mapping is a process for creating UVs in a surface, which includes creating and editing, and determines how to display the image on a three-dimensional model. UVs are two-dimensional texture coordinates on vertices of polygon meshes which define a two-dimensional texture coordinate system called UV texture space. This space defines the coordinate axis using letter U and V to determine how to place a texture image on the surface of the three-dimensional model.

The spherical panoramic mathematical model is a sphere composed of longitude and latitude; and then a left image is mapped to the left hemispheric curved surface, a right image is mapped to the right hemispheric curved surface in a UV mapping manner. However, when the images or video frames photographed by the panoramic camera are not horizontal, then the images mapped to the spherical panoramic mathematical model are not horizontal, and the rendered images or video frames of the panoramic camera will be distorted.

Technical Problem

The present invention aims to provide a horizontal calibration method and system for a panoramic image or video, and a portable terminal, which solve the problems that when the images or video frames photographed by the existing panoramic camera are not horizontal, then the images mapped to the spherical panoramic mathematical model are not horizontal, and the rendered images or video frames of the panoramic camera will be distorted.

Technical Solution

A first aspect of the present invention provides a horizontal calibration method for a panoramic image or video, comprises steps of:

receiving images or video frames of two circles after being imaged by two cameras having opposite photographing directions;

acquiring a horizontal calibration matrix during photographing; and mapping, according to the horizontal calibration matrix, the images or video frames of the two circles to a left hemispherical curved surface and a right hemispherical curved surface of a spherical panoramic mathematical model in a UV mapping manner, respectively, whereby the panoramic images or video frames mapped in the spherical panoramic mathematical model being horizontal.

A second aspect of the present invention provides a horizontal calibration system for a panoramic image or video, comprises:

a receiving unit, for receiving images or video frames of two circles after being imaged by two cameras having opposite photographing directions;

an acquisition unit, for acquiring a horizontal calibration matrix during photographing; and a mapping unit, for mapping, according to the horizontal calibration matrix, the images or video frames of the two circles to a left hemispherical curved surface and a right hemispherical curved surface of a spherical panoramic mathematical model in a UV mapping manner, respectively, whereby the panoramic images or video frames mapped in the spherical panoramic mathematical model being horizontal.

A third aspect of the present invention is to provide a portable terminal, comprises the above horizontal calibration system for a panoramic image or video.

Advantages

In the present invention, due to acquiring the horizontal calibration matrix during photographing, according to the horizontal calibration matrix, and mapping the images or video frames of the two circles imaged by two cameras having opposite photographing directions respectively to a left hemispherical curved surface and a right hemispherical curved surface of a spherical panoramic mathematical model in a UV mapping manner; therefore, even images or a video frames photographed by a panoramic camera are not horizontal, the panoramic images or the video frames mapped in a spherical panoramic mathematical model is still horizontal.

DETAILED DESCRIPTION OF THE INVENTION

Objects, features and advantages of the present invention will be more apparent upon consideration of the following detailed description and taken in conjunction with the accompanying drawings. It should be understood that the detail embodiments described herein are used only to explain the invention, but not intended to limit the scope of the present invention.

The following detail embodiments are used to explain the features of the invention.

First Embodiment

Figure 1:
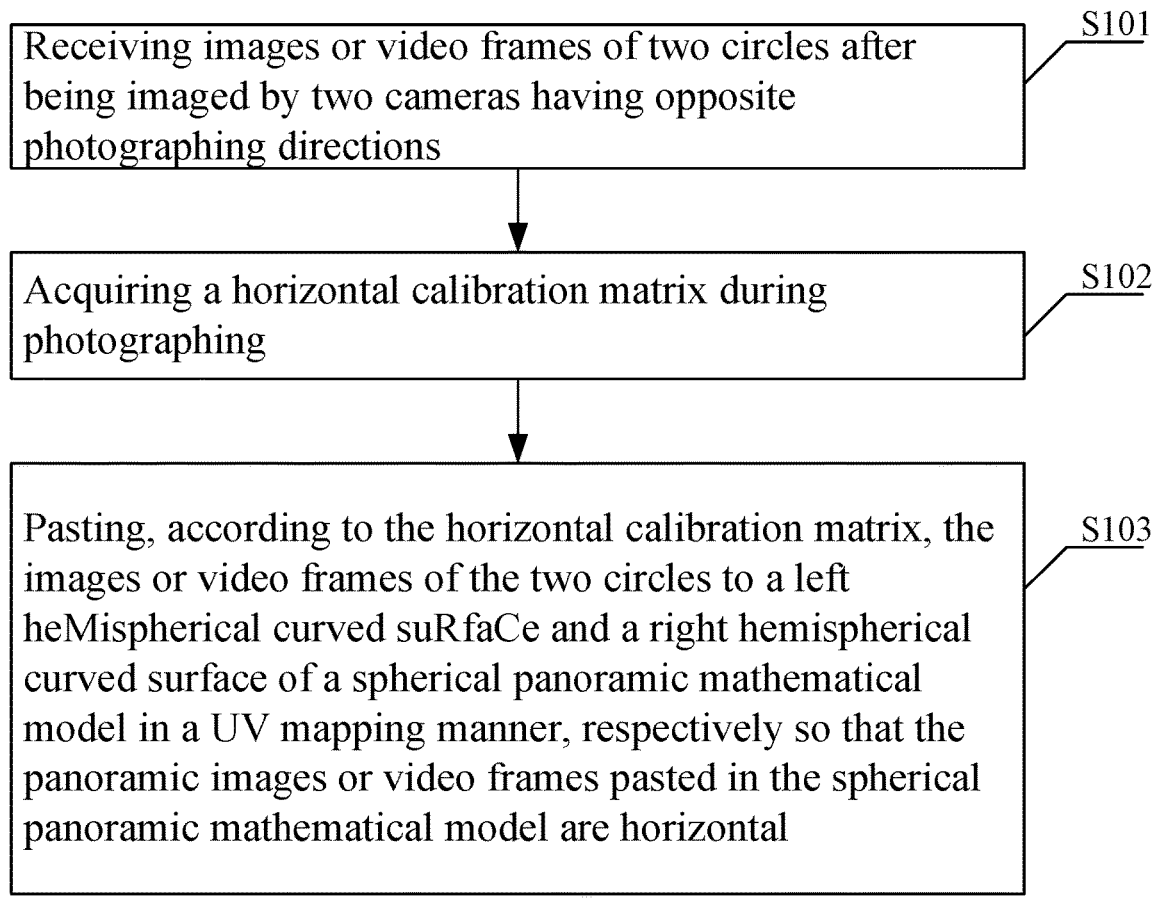
FIG. 1 is a flowchart illustrating a horizontal calibration method for a panoramic image or video in accordance with a first embodiment of the present invention.

Referring to FIG. 1, in the first embodiment of the present invention, a horizontal calibration method for a panoramic image or video, comprises steps of:

S101, receiving images or video frames of two circles after being imaged by two cameras having opposite photographing directions;

S102, acquiring a horizontal calibration matrix during photographing; and

S103, mapping, according to the horizontal calibration matrix, the images or video frames of the two circles to a left hemispherical curved surface and a right hemispherical curved surface of a spherical panoramic mathematical model in a UV mapping manner, respectively so that the panoramic images or video frames mapping in the spherical panoramic mathematical model being horizontal.

In the first embodiment of the present invention, steps of S101 and S102 are interchangeable.

According to the existing UV mapping, vertices of the spherical panoramic mathematical model correspond to UV mapping one by one; therefore, if multiplying the spherical panoramic mathematical model by the horizontal calibration matrix during UV mapping, the vertices of the spherical panoramic mathematical model can remain unchanged, while the position of UV mapping is changed, and become horizontal.

In step S102, specifically, acquiring the horizontal calibration matrix during photographing via a gyroscope and/or user manual calibration.

In accordance with the first embodiment, acquiring the horizontal calibration matrix during photographing using a gyroscope, specifically comprises steps of:

during photographing, acquiring a horizontal calibration quaternion according to a gravity vector and a reference absolute horizontal gravity vector (0, 0, −1) of the gyroscope, specifically:

calculating the horizontal calibration quaternion q from v1 rotation to v2, as:

$$v1 = [x1 \quad y1 \quad z1]$$
$$v2 = [x2 \quad y2 \quad z2]$$
$$v3 = [x3 \quad y3 \quad z3]$$
$$dot = v1 \cdot v2 = x1x2 + y1y2 + z1z2 = |v1| \times |v2| \times \cos(angle)$$
$$angle = a\cos(dot) * 180/\pi$$
$$v3 = v1 \times v2 = \begin{bmatrix} x1 \\ y1 \\ z1 \end{bmatrix} \times \begin{bmatrix} x2 \\ y2 \\ z2 \end{bmatrix} = \begin{bmatrix} y1z2 - z1y2 \\ z1x2 - x1z2 \\ x1y2 - y1x2 \end{bmatrix}$$
$$q = \begin{bmatrix} w \\ x \\ y \\ z \end{bmatrix} = \begin{bmatrix} \cos(angle/180*\pi/2) \\ \sin(angle/180*\pi/2)*x3 \\ \sin(angle/180*\pi/2)*y3 \\ \sin(angle/180*\pi/2)*z3 \end{bmatrix}$$

herein, v1 represents the gravity vector of the gyroscope, v2 represents the reference absolute horizontal gravity vector, angle represents a rotation angle about an axis, v3 represents the vector of multiplying matrix v1 by matrix v2; and converting the horizontal calibration quaternion to the horizontal calibration matrix, specifically, converting the horizontal calibration quaternion to the horizontal calibration matrix M0 of 4*4:

$$M0 = \begin{bmatrix} 1.0 - 2.0*(y^2 + z^2) & 2.0*(xy + wz) & 2.0*(xz - wy) & 0 \\ 2.0*(xy - wz) & 1.0 - 2.0*(x^2 + z^2) & 2.0*(yz + wx) & 0 \\ 2.0*(xz + wy) & 2.0*(yz - wx) & 1.0 - 2.0*(x^2 + y^2) & 0 \\ 0 & 0 & 0 & 1 \end{bmatrix}.$$

In accordance with the first embodiment, acquiring the horizontal calibration matrix during photographing via user manual calibration, specifically comprises steps of:

acquiring an Initial Quaternion q1 before user manual calibration, $$q1 = \begin{bmatrix} w \\ x \\ y \\ z \end{bmatrix};$$

receiving user's gesture operation instructions to a screen, and calculating a quaternion q3 after gesture operation based on a formula of a quaternion q2 constructed according to a rotation axis and a rotation angle about the axis; where the formula of the quaternion q2 constructed according to a rotation axis and a rotation angle about the axis, is:

$$q2 = \begin{bmatrix} w2 \\ x2 \\ y2 \\ z2 \end{bmatrix} = \begin{bmatrix} \cos(angle/180*\pi/2) \\ \sin(angle/180*\pi/2)*axis \cdot x \\ \sin(angle/180*\pi/2)*axis \cdot y \\ \sin(angle/180*\pi/2)*axis \cdot z \end{bmatrix}$$

where user's gesture operation instructions to a screen are respectively about the world coordinate system x, y, and z axis to rotate with an angle:

−dy*180/320/8/180*π, −dx*180/320/8/180*π, and deltaSlope; herein, dx represents a value of user horizontal sliding screen, dy represents a value of user longitudinal sliding screen, deltaSlope represents slope changing for user sliding operation with one finger, slope changing:

deltaSlope=a tan(currSlope)*180/π−a tan (preSlope)*180/π, a current Slope: currSlope=(y2−y1)/(x2−x1), coordinates of a first point are p1(x1, y1), coordinates of a second point are p2(x2, y2), preslope represents slope changing for user previous sliding operation with one finger;

calculating the quaternion q3 after gesture operation based on the following formula:

$$q3 = q1 \times q2 = \begin{bmatrix} w*w2 - x*x2 - y*y2 - z*z2 \\ w*x2 + x*w2 + y*z2 - z*y2 \\ w*y2 + y*w2 + z*x2 - x*z2 \\ w*z2 + z*w2 + x*y2 - y*x2 \end{bmatrix},$$

and converting the quaternion q3 after gesture operation to a horizontal calibration matrix, specifically: converting the horizontal calibration quaternion to the horizontal calibration matrix M0 of 4*4:

$$M0 = \begin{bmatrix} 1.0 - 2.0*(y^2 + z^2) & 2.0*(xy + wz) & 2.0*(xz - wy) & 0 \\ 2.0*(xy - wz) & 1.0 - 2.0*(x^2 + z^2) & 2.0*(yz + wx) & 0 \\ 2.0*(xz + wy) & 2.0*(yz - wx) & 1.0 - 2.0*(x^2 + y^2) & 0 \\ 0 & 0 & 0 & 1 \end{bmatrix}.$$

In accordance with the first embodiment, step of S103 specifically comprises steps of:

obtaining a spherical panoramic mathematical model after relative rotation via multiplying the horizontal calibration matrix by a spherical panoramic mathematical model of longitude and latitude; and mapping the images or video frames of the two circles respectively to a left hemispherical curved surface and a right hemispherical curved surface of the spherical panoramic mathematical model after relative rotation in a UV mapping manner.

Step of obtaining a spherical panoramic mathematical model after relative rotation via multiplying the horizontal calibration matrix by the spherical panoramic mathematical model of longitude and latitude, may further comprise steps of:

during generating data of UV mapping, according to calculation of the spherical panoramic mathematical model of longitude and latitude, obtaining each vertex of the spherical panoramic mathematical model based on the following formula:

$$V = \begin{bmatrix} x \\ y \\ z \\ 1 \end{bmatrix} = \begin{bmatrix} \sin\varphi\cos\theta \\ \sin\varphi\sin\theta \\ \cos\varphi \\ 1 \end{bmatrix},$$

herein, longitude $\varphi$ has a degree range of 0-180 degrees, and latitude $\theta$ has a degree range of 0-360 degrees;

multiplying the vertex by the horizontal calibration matrix according to the following formula:

$$V = \begin{bmatrix} x \\ y \\ z \\ 1 \end{bmatrix} \times M0 = \begin{bmatrix} x' \\ y' \\ z' \\ 1 \end{bmatrix};$$

and converting the vertex multiplied by the horizontal calibration matrix back to longitude and latitude and calculating UV coordinates, specifically: establishing a mapping relationship between longitude and latitude and the two circles of the target map.

Step of mapping the images or video frames of the two circles respectively to a left hemispherical curved surface and a right hemispherical curved surface of the spherical panoramic mathematical model after relative rotation in a UV mapping manner, specifically:

according to the UV coordinates, mapping the images or video frames of the two circles respectively to a left hemispherical curved surface and a right hemispherical curved surface of the spherical panoramic mathematical model after relative rotation in a UV mapping manner.

In accordance with the first embodiment, in step of S102, if acquiring the horizontal calibration matrix during photographing by means of both a gyroscope and user manual calibration, then obtaining the vertex V multiplied by the horizontal calibration matrix via steps of:

acquiring an intermediate matrix by multiplying the vertex V by the horizontal calibration matrix obtained during photographing via user manual calibration; and then, multiplying the intermediate matrix by the horizontal calibration matrix obtained during photographing using a gyroscope, and thus acquiring the vertex V multiplied by the horizontal calibration matrix.

Second Embodiment

Figure 2:
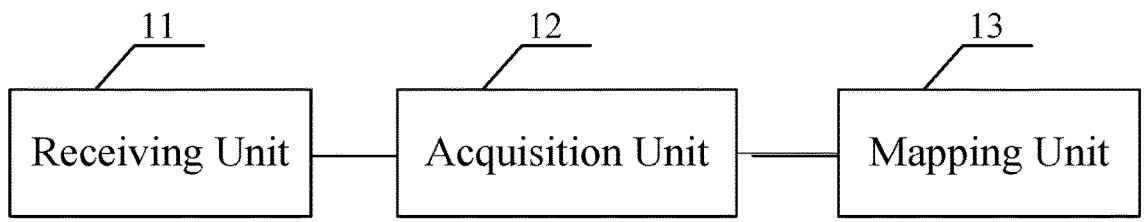
FIG. 2 is a schematic diagram illustrating a horizontal calibration system for a panoramic image or video in accordance with a second embodiment of the present invention.

Referring to FIG. 2, in accordance with a second embodiment of the present invention, a horizontal calibration system for a panoramic image or video, comprises:

a receiving unit 11, receiving images or video frames of two circles after being imaged by two cameras having opposite photographing directions;

an acquisition unit 12, acquiring a horizontal calibration matrix during photographing; and a mapping unit 13, mapping, according to the horizontal calibration matrix, the images or video frames of the two circles to a left hemispherical curved surface and a right hemispherical curved surface of a spherical panoramic mathematical model in a UV mapping manner, respectively, whereby the panoramic images or video frames mapped in the spherical panoramic mathematical model being horizontal.

In accordance with the second embodiment, the acquisition unit is used for acquiring the horizontal calibration matrix during photographing by means of a gyroscope and/or user manual calibration.

In accordance with the second embodiment, the mapping unit specifically comprises:

a multiplication unit, used for obtaining a spherical panoramic mathematical model after relative rotation via multiplying the horizontal calibration matrix by the spherical panoramic mathematical model of longitude and latitude; and a mapping sub-unit, used for mapping the images or video frames of the two circles respectively to a left hemispherical curved surface and a right hemispherical curved surface of the spherical panoramic mathematical model after relative rotation in a UV mapping manner.

The embodiment of the present invention provides a portable terminal. The portable terminal comprises the horizontal calibration system for a panoramic image or video described above in the second embodiment of the present invention.

In the present invention, by means of acquiring a horizontal calibration matrix during photographing; according to the horizontal calibration matrix, mapping the images or video frames of the two circles imaged by two cameras with opposite photographing directions, respectively to a left hemispherical curved surface and a right hemispherical curved surface of a spherical panoramic mathematical model in a UV mapping manner; therefore, in this invention, even images or a video frames photographed by a panoramic camera are not horizontal, the panoramic images or the video frames mapped in a spherical panoramic mathematical model is still horizontal.

It is understood that, all or some steps of the method in above embodiments may be performed through computer programs instructing related hardware, the computer programs may be stored in a computer readable memory, such computer readable memory as ROM/RAM, magnetic disk, optical disc, etc.

The above mentioned is preferred embodiments of the invention and is not used to limit the invention. Any changes, equivalent replacements and modifications made within the spirit and principles of the invention, shall be included in the protection scope of the invention.

What is claimed is:

1. A horizontal calibration method for a panoramic image or video, comprising steps of:
receiving images or video frames of two circles after being imaged by two cameras having opposite photographing directions;
acquiring a horizontal calibration matrix during photographing by means of a gyroscope; and
mapping, according to the horizontal calibration matrix, the images or video frames of the two circles to a left hemispherical curved surface and a right hemispherical curved surface of a spherical panoramic mathematical model in a UV mapping manner, respectively, whereby the panoramic images or video frames mapped in the spherical panoramic mathematical model being horizontal;
wherein the step of acquiring the horizontal calibration matrix during photographing by means of a gyroscope, further comprises steps of:
during photographing, according to a gravity vector and a reference absolute horizontal gravity vector (0, 0, −1) of the gyroscope, acquiring a horizontal calibration quaternion, specifically:
calculating the horizontal calibration quaternion q from v1 rotation to v2, as:

$$v1 = [x1 \quad y1 \quad z1]$$
$$v2 = [x2 \quad y2 \quad z2]$$
$$v3 = [x3 \quad y3 \quad z3]$$
$$dot = v1 \cdot v2 = x1x2 + y1y2 + z1z2 = |v1| \times |v2| \times \cos(\text{angle})$$
$$\text{angle} = a\cos(dot) * 180/\pi$$
$$v3 = v1 \times v2 = \begin{bmatrix} x1 \\ y1 \\ z1 \end{bmatrix} \times \begin{bmatrix} x2 \\ y2 \\ z2 \end{bmatrix} = \begin{bmatrix} y1z2 - z1y2 \\ z1x2 - x1z2 \\ x1y2 - y1x2 \end{bmatrix}$$
$$q = \begin{bmatrix} w \\ x \\ y \\ z \end{bmatrix} = \begin{bmatrix} \cos(\text{angle}/180*\pi/2) \\ \sin(\text{angle}/180*\pi/2)*x3 \\ \sin(\text{angle}/180*\pi/2)*y3 \\ \sin(\text{angle}/180*\pi/2)*z3 \end{bmatrix}$$

where, v1 represents the gravity vector of the gyroscope, v2 represents the reference absolute horizontal gravity vector, angle represents a rotation angle about an axis, v3 represents a vector of multiplying matrix v1 by matrix v2; and
converting the horizontal calibration quaternion to the horizontal calibration matrix, specifically, converting the horizontal calibration quaternion to the horizontal calibration matrix M0 of 4*4:

$$M0 = \begin{bmatrix} 1.0-2.0*(y^2+z^2) & 2.0*(xy+wz) & 2.0*(xz-wy) & 0 \\ 2.0*(xy-wz) & 1.0-2.0*(x^2+z^2) & 2.0*(yz+wx) & 0 \\ 2.0*(xz+wy) & 2.0*(yz-wx) & 1.0-2.0*(x^2+y^2) & 0 \\ 0 & 0 & 0 & 1 \end{bmatrix}.$$

2. A horizontal calibration method for a panoramic image or video, comprising steps of:
receiving images or video frames of two circles after being imaged by two cameras having opposite photographing directions;
acquiring a horizontal calibration matrix during photographing by means of user manual calibration; and
mapping, according to the horizontal calibration matrix, the images or video frames of the two circles to a left hemispherical curved surface and a right hemispherical curved surface of a spherical panoramic mathematical model in a UV mapping manner, respectively, whereby the panoramic images or video frames mapped in the spherical panoramic mathematical model being horizontal;
wherein the step of acquiring the horizontal calibration matrix during photographing by means of user manual calibration, further comprising steps of:
acquiring an Initial Quaternion q1 before user manual calibration, $$q1 = \begin{bmatrix} w \\ x \\ y \\ z \end{bmatrix};$$

receiving user's gesture operation instructions to a screen, and calculating a quaternion q3 after gesture operation based on a formula of a quaternion q2 constructed according to a rotation axis and a rotation angle about the axis; where the formula of the quaternion q2 constructed according to a rotation axis and a rotation angle about the axis, is:

$$q2 = \begin{bmatrix} w2 \\ x2 \\ y2 \\ z2 \end{bmatrix} = \begin{bmatrix} \cos(\text{angle}/180*\pi/2) \\ \sin(\text{angle}/180*\pi/2)*\text{axis} \cdot x \\ \sin(\text{angle}/180*\pi/2)*\text{axis} \cdot y \\ \sin(\text{angle}/180*\pi/2)*\text{axis} \cdot z \end{bmatrix},$$

where user's gesture operation instructions to a screen are about the world coordinate system x, y, and z axis to rotate with an angle: −dy*180/320/8/180*π, −dx*180/320/8/180*π, deltaSlope, respectively; here, dx represents a value of user horizontal sliding screen, dy represents a value of user longitudinal sliding screen, deltaSlope represents slope changing for user sliding operation with one finger, slope changing: deltaSlope=a tan(currSlope)*180/π−a tan(preSlope)*180/π, a current Slope: currSlope=(y2−y1)/(x2−x1), coordinates of a first point are p1(x1, y1) coordinates of a second point are p2(x2, y2), preslope represents slope changing for user previous sliding operation with one finger; and
calculating the quaternion q3 after gesture operation based on the following formula:

$$q3 = q1 \times q2 = \begin{bmatrix} w*w2 - x*x2 - y*y2 - z*z2 \\ w*x2 + x*w2 + y*z2 - z*y2 \\ w*y2 + y*w2 + z*x2 - x*z2 \\ w*z2 + z*w2 + x*y2 - y*x2 \end{bmatrix};$$

and
converting the quaternion q3 after gesture operation to the horizontal calibration matrix, specifically, converting the horizontal calibration quaternion to the horizontal calibration matrix M0 of 4*4:

$$M0 = \begin{bmatrix} 1.0 - 2.0*(y^2+z^2) & 2.0*(xy+wz) & 2.0*(xz-wy) & 0 \\ 2.0*(xy-wz) & 1.0-2.0*(x^2+z^2) & 2.0*(yz+wx) & 0 \\ 2.0*(xz+wy) & 2.0*(yz-wx) & 1.0-2.0*(x^2+y^2) & 0 \\ 0 & 0 & 0 & 1 \end{bmatrix}.$$

3. The horizontal calibration method of claim 1, wherein the step of mapping, according to the horizontal calibration matrix, the images or video frames of the two circles to a left hemispherical curved surface and a right hemispherical curved surface of a spherical panoramic mathematical model in a UV mapping manner, respectively, further comprises of steps of:
obtaining a spherical panoramic mathematical model after relative rotation via the horizontal calibration matrix being multiplied by the spherical panoramic mathematical model of longitude and latitude; and
mapping the images or video frames of the two circles respectively to a left hemispherical curved surface and a right hemispherical curved surface of the spherical panoramic mathematical model after relative rotation in a UV mapping manner.

4. The horizontal calibration method of claim 3, wherein the step of obtaining a spherical panoramic mathematical model after relative rotation via the horizontal calibration matrix being multiplied by the spherical panoramic mathematical model of longitude and latitude, further comprises step of:
during generating data of UV mapping, according to calculation of the spherical panoramic mathematical model of longitude and latitude, obtaining each vertex of the spherical panoramic mathematical model based on the following formula:

$$V = \begin{bmatrix} x \\ y \\ z \\ 1 \end{bmatrix} = \begin{bmatrix} \sin\varphi\cos\theta \\ \sin\varphi\sin\theta \\ \cos\varphi \\ 1 \end{bmatrix},$$

where longitude $\varphi$ has a degree range of 0-180 degrees, latitude $\theta$ has a degree range of 0-360 degrees;
multiplying the vertex by the horizontal calibration matrix according to the following formula:

$$V = \begin{bmatrix} x \\ y \\ z \\ 1 \end{bmatrix} \times M0 = \begin{bmatrix} x' \\ y' \\ z' \\ 1 \end{bmatrix};$$

and
converting the vertex multiplied by the horizontal calibration matrix back to longitude and latitude, and calculating the UV coordinates.

5. The horizontal calibration method of claim 4, wherein the step of mapping the images or video frames of the two circles respectively to a left hemispherical curved surface and a right hemispherical curved surface of the spherical panoramic mathematical model after relative rotation in a UV mapping manner, specifically is:
according to the UV coordinates, mapping the images or video frames of the two circles respectively to a left hemispherical curved surface and a right hemispherical curved surface of the spherical panoramic mathematical model after relative rotation in a UV mapping manner.

6. A horizontal calibration method for a panoramic image or video, comprising steps of:
receiving images or video frames of two circles after being imaged by two cameras having opposite photographing directions;
acquiring a horizontal calibration matrix during photographing by means of user manual calibration;
obtaining a spherical panoramic mathematical model after relative rotation via the horizontal calibration matrix being multiplied by the spherical panoramic mathematical model of longitude and latitude; and
mapping the images or video frames of the two circles respectively to a left hemispherical curved surface and a right hemispherical curved surface of the spherical panoramic mathematical model after relative rotation in a UV mapping manner; whereby the panoramic images or video frames mapped in the spherical panoramic mathematical model being horizontal; wherein the step of obtaining a spherical panoramic mathematical model after relative rotation via the horizontal calibration matrix being multiplied by the spherical panoramic mathematical model of longitude and latitude, further comprises step of:
during generating data of UV mapping, according to calculation of the spherical panoramic mathematical model of longitude and latitude, obtaining each vertex of the spherical panoramic mathematical model based on the following formula:

$$V = \begin{bmatrix} x \\ y \\ z \\ 1 \end{bmatrix} = \begin{bmatrix} \sin\varphi\cos\theta \\ \sin\varphi\sin\theta \\ \cos\varphi \\ 1 \end{bmatrix},$$

where longitude $\varphi$ has a degree range of 0-180 degrees, latitude $\theta$ has a degree range of 0 to 360 degrees;
multiplying the vertex by the horizontal calibration matrix according to the following formula:

$$V = \begin{bmatrix} x \\ y \\ z \\ 1 \end{bmatrix} \times M0 = \begin{bmatrix} x' \\ y' \\ z' \\ 1 \end{bmatrix};$$

and
converting the vertex multiplied by the horizontal calibration matrix back to longitude and latitude, and calculating the UV coordinates;
wherein if acquiring the horizontal calibration matrix during photographing by means of both a gyroscope and user manual calibration, then obtaining the vertex V multiplied by the horizontal calibration matrix via steps of:

acquiring an intermediate matrix by multiplying the vertex V by the horizontal calibration matrix obtained during photographing via user manual calibration, and then, multiplying the intermediate matrix by the horizontal calibration matrix obtained during photographing using a gyroscope, whereby acquiring the vertex V multiplied by the horizontal calibration matrix.

7. The horizontal calibration method of claim 2, wherein the step of mapping, according to the horizontal calibration matrix, the images or video frames of the two circles to a left hemispherical curved surface and a right hemispherical curved surface of a spherical panoramic mathematical model in a UV mapping manner, respectively, further comprises of steps of:
   obtaining a spherical panoramic mathematical model after relative rotation via the horizontal calibration matrix being multiplied by the spherical panoramic mathematical model of longitude and latitude; and
   mapping the images or video frames of the two circles respectively to a left hemispherical curved surface and a right hemispherical curved surface of the spherical panoramic mathematical model after relative rotation in a UV mapping manner.

8. The horizontal calibration method of claim 7, wherein the step of obtaining a spherical panoramic mathematical model after relative rotation via the horizontal calibration matrix being multiplied by the spherical panoramic mathematical model of longitude and latitude, further comprises step of:
   during generating data of UV mapping, according to calculation of the spherical panoramic mathematical model of longitude and latitude, obtaining each vertex of the spherical panoramic mathematical model based on the following formula:

$$V = \begin{bmatrix} x \\ y \\ z \\ 1 \end{bmatrix} = \begin{bmatrix} \sin\varphi\cos\theta \\ \sin\varphi\sin\theta \\ \cos\varphi \\ 1 \end{bmatrix},$$

where longitude $\varphi$ has a degree range of 0-180 degrees, latitude $\theta$ has a degree range of 0-360 degrees;
   multiplying the vertex by the horizontal calibration matrix according to the following formula:

$$V = \begin{bmatrix} x \\ y \\ z \\ 1 \end{bmatrix} \times M0 = \begin{bmatrix} x' \\ y' \\ z' \\ 1 \end{bmatrix};$$

and
   converting the vertex multiplied by the horizontal calibration matrix back to longitude and latitude, and calculating the UV coordinates.

9. The horizontal calibration method of claim 8, wherein the step of mapping the images or video frames of the two circles respectively to a left hemispherical curved surface and a right hemispherical curved surface of the spherical panoramic mathematical model after relative rotation in a UV mapping manner, specifically is:
   according to the UV coordinates, mapping the images or video frames of the two circles respectively to a left hemispherical curved surface and a right hemispherical curved surface of the spherical panoramic mathematical model after relative rotation in a UV mapping manner.

10. The horizontal calibration method of claim 6, wherein the step of mapping the images or video frames of the two circles respectively to a left hemispherical curved surface and a right hemispherical curved surface of the spherical panoramic mathematical model after relative rotation in a UV mapping manner, specifically is:
   according to the UV coordinates, mapping the images or video frames of the two circles respectively to a left hemispherical curved surface and a right hemispherical curved surface of the spherical panoramic mathematical model after relative rotation in a UV mapping manner.

11. The horizontal calibration method of claim 6, wherein obtaining the horizontal calibration matrix during photographing via user manual calibration, comprises steps of:

$$q1 = \begin{bmatrix} w \\ x \\ y \\ z \end{bmatrix};$$

acquiring an Initial Quaternion q1 before user manual calibration,
receiving user's gesture operation instructions to a screen, and calculating a quaternion q3 after gesture operation based on a formula of a quaternion q2 constructed according to a rotation axis and a rotation angle about the axis; where the formula of the quaternion q2 constructed according to a rotation axis and a rotation angle about the axis, is:

$$q2 = \begin{bmatrix} w2 \\ x2 \\ y2 \\ z2 \end{bmatrix} = \begin{bmatrix} \cos(\text{angle}/180*\pi/2) \\ \sin(\text{angle}/180*\pi/2)*axis.x \\ \sin(\text{angle}/180*\pi/2)*axis.y \\ \sin(\text{angle}/180*\pi/2)*axis.z \end{bmatrix},$$

where user's gesture operation instructions to a screen are about the world coordinate system x, y, and z axis to rotate with an angle: $-dy*180/320/8/180*\pi$, $-dx*180/320/8/180*\pi$, deltaSlope, respectively; here, dx represents a value of user horizontal sliding screen, dy represents a value of user longitudinal sliding screen, deltaSlope represents slope changing for user sliding operation with one finger, slope changing: deltaSlope=a tan(currSlope)*180/$\pi$–a tan(preSlope)*180/$\pi$, a current Slope: currSlope=(y2-y1)/(x2-x1), coordinates of a first point are p1(x1, y1) coordinates of a second point are p2(x2, y2), preslope represents slope changing for user previous sliding operation with one finger; and
calculating the quaternion q3 after gesture operation based on the following formula:

$$q3 = q1 \times q2 = \begin{bmatrix} w*w2 - x*x2 - y*y2 - z*z2 \\ w*x2 + x*w2 + y*z2 - z*y2 \\ w*y2 + y*w2 + z*x2 - x*z2 \\ w*z2 + z*w2 + x*y2 - y*x2 \end{bmatrix};$$

and converting the quaternion q3 after gesture operation to the horizontal calibration matrix, specifically, converting the horizontal calibration quaternion to the horizontal calibration matrix M0 of 4*4:

$$M0 = \begin{bmatrix} 1.0-2.0*(y^2+z^2) & 2.0*(xy+wz) & 2.0*(xz-wy) & 0 \\ 2.0*(xy-wz) & 1.0-2.0*(x^2+z^2) & 2.0*(yz+wx) & 0 \\ 2.0*(xz+wy) & 2.0*(yz-wx) & 1.0-2.0*(x^2+y^2) & 0 \\ 0 & 0 & 0 & 1 \end{bmatrix}.$$

12. The horizontal calibration method of claim 6, wherein obtaining the horizontal calibration matrix during photographing using a gyroscope, comprises steps of:

during photographing, according to a gravity vector and a reference absolute horizontal gravity vector (0, 0, −1) of the gyroscope, acquiring a horizontal calibration quaternion, specifically:

calculating the horizontal calibration quaternion q from v1 rotation to v2, as:

$$v1 = [x1 \ y1 \ z1]$$
$$v2 = [x2 \ y2 \ z2]$$
$$v3 = [x3 \ y3 \ z3]$$

-continued $$dot = v1 \cdot v2 = x1x2 + y1y2 + z1z2 = |v1| \times |v2| \times \cos(\text{angle})$$

$$\text{angle} = a\cos(dot) * 180/\pi$$

$$v3 = v1 \times v2 = \begin{bmatrix} x1 \\ y1 \\ z1 \end{bmatrix} \times \begin{bmatrix} x2 \\ y2 \\ z2 \end{bmatrix} = \begin{bmatrix} y1z2 - z1y2 \\ z1x2 - x1z2 \\ x1y2 - y1x2 \end{bmatrix}$$

$$q = \begin{bmatrix} w \\ x \\ y \\ z \end{bmatrix} = \begin{bmatrix} \cos(\text{angle}/180*\pi/2) \\ \sin(\text{angle}/180*\pi/2)*x3 \\ \sin(\text{angle}/180*\pi/2)*y3 \\ \sin(\text{angle}/180*\pi/2)*z3 \end{bmatrix}$$

where, v1 represents the gravity vector of the gyroscope, v2 represents the reference absolute horizontal gravity vector, angle represents a rotation angle about an axis, v3 represents a vector of multiplying matrix v1 by matrix v2; and converting the horizontal calibration quaternion to the horizontal calibration matrix, specifically, converting the horizontal calibration quaternion to the horizontal calibration matrix M0 of 4*4:

$$M0 = \begin{bmatrix} 1.0-2.0*(y^2+z^2) & 2.0*(xy+wz) & 2.0*(xz-wy) & 0 \\ 2.0*(xy-wz) & 1.0-2.0*(x^2+z^2) & 2.0*(yz+wx) & 0 \\ 2.0*(xz+wy) & 2.0*(yz-wx) & 1.0-2.0*(x^2+y^2) & 0 \\ 0 & 0 & 0 & 1 \end{bmatrix}.$$

* * * * *